J. H. STIMPSON.
Lathe-Dogs.

No. 154,426.                                  Patented Aug. 25, 1874.

WITNESSES:                                    INVENTOR:

UNITED STATES PATENT OFFICE.

J. HENRY STIMPSON, OF ST. LOUIS, MISSOURI.

IMPROVEMENT IN LATHE-DOGS.

Specification forming part of Letters Patent No. 154,426, dated August 25, 1874; application filed May 29, 1784.

*To all whom it may concern:*

Be it known that I, J. HENRY STIMPSON, of St. Louis, St. Louis county, Missouri, have invented a new and Improved Lathe-Chuck, of which the following is a specification:

My invention relates to that class of lathe-dogs in which are combined two serrated and slotted plates, each carrying a jaw, and clamped together and to the face-plate of a lathe by a bolt. It consists in the application to the plates of serrations of such construction or form as to cause the jaws at all times, when force is applied, to be forced toward each other, and an improved construction and relative arrangement of the parts by which all torsional or twisting strain is obviated, by directing the force applied to close the jaws in planes that pass through and on both sides of the point of resistance.

Figure 1:
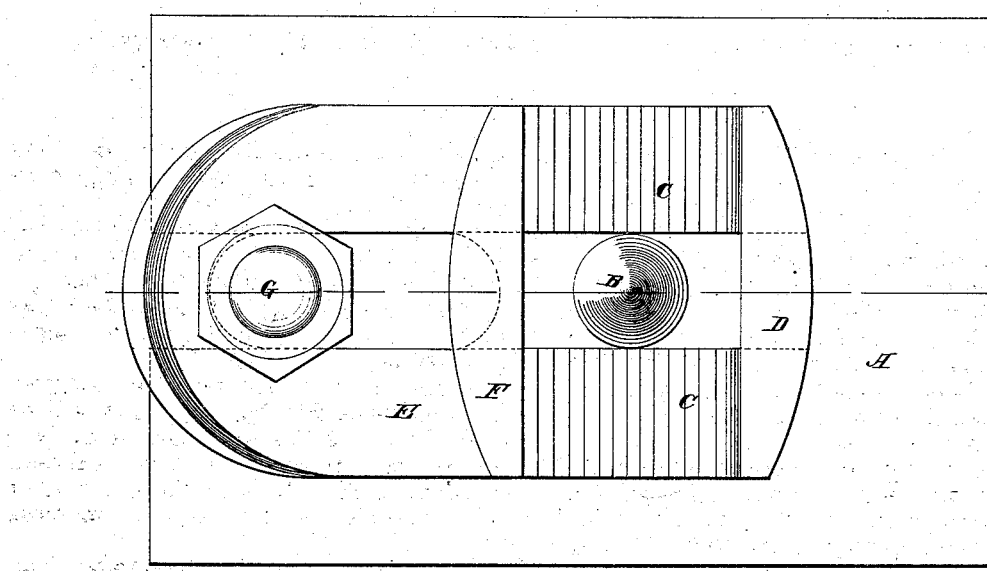
Figure 2:
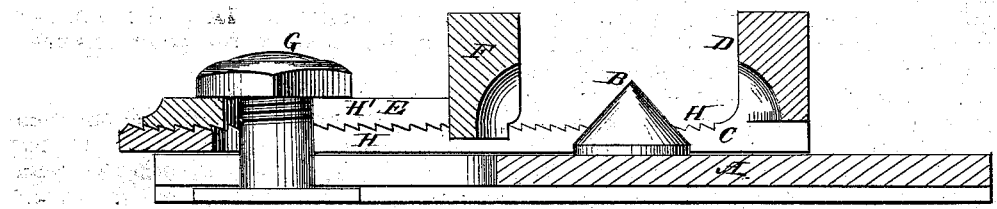

Figure 1 is a front elevation of my improved lathe-chuck. Fig. 2 is a longitudinal section taken on the line $y\ y$, Fig. 1.

Similar letters of reference indicate corresponding parts.

A represents a portion of the face-plate of a lathe; B, the lathe-center; C, the back-plate of the chuck; D, the flange of said plate, forming its jaw; E, the front-plate of the chuck; F, the flange forming its jaw; G, the bolts by which the plates are clamped to the face-plates, and also clamped together, said bolt passing through a slot in each plate, so that they can all be adjusted relatively to each other. H H are the serrations on the front face of plate C, and H' are the serrations on the rear face of plate E. The inclined faces of the serrations H are forward toward the jaws, and the inclined faces of the serrations H' are rearward, or from the jaws.

The operation is as follows: The article to be held is placed between the jaws, centered on the center B; the jaws are moved up to each side of it, and the plates are then brought together by screwing the nut on the bolt G, thus firmly clamping the article in the jaws.

In lathe-dogs of this class heretofore constructed, the serrations have faces inclined both ways, so that when the plates are placed together to be clamped by the bolt, the point of the serrations on the movable plate must be placed on the forward face of the serrations on the fixed plate, in order to cause the movable plate and its jaws to move toward the other jaw. If this is not done, when the plates are clamped they will move their jaws away from each other, and destroy the usefulness of the dog.

The construction of the serrations adopted by me overcomes this difficulty, as it will be obvious that no matter what part of the serrations of the two plates E C come together, the tendency will be to force them and their jaws in opposite directions—*i. e.*, to close them.

In lathe-dogs of this class heretofore constructed, the serrated plates are so arranged with relation to the jaws, that the force exerted is applied to only one side of the jaws, and the consequence has been that the strain was torsional or twisting, and much greater force had to be applied to the screw than by my arrangement.

These difficulties I have overcome by my improved construction and arrangement of the parts, so that the serrations are parallel to, and behind one and in front of the other face of the jaws, and the resistance is in a plane at right angles to them, the force extending on both sides of the point of resistance.

What I claim is—

As an improvement in lathe-chucks composed of slotted and serrated jaw-carrying plates and a clamping bolt, the plates C, relatively constructed and arranged, as shown and described, with reference to application and effect of the force exerted for closing the jaws D F, and respectively provided with serrations H H', having inclined and vertical faces, but pitched in opposite directions, to cause the jaws to move toward each other when clamped together, as specified.

J. HENRY STIMPSON.

Witnesses:
JNO. THOMPSON,
ADOLF NEUBERG.